US010637190B2

(12) United States Patent
Zhang (10) Patent No.: US 10,637,190 B2
(45) Date of Patent: Apr. 28, 2020

(54) CABLE END FITTING AND CABLE ABUTMENT AND METHOD OF SECUREMENT (71) Applicant: INTEVA PRODUCTS, LLC, Troy, MI (US)

(72) Inventor: Hongqiang Zhang, Shanghai (CN)

(73) Assignee: INTEVA PRODUCTS, LLC, Troy, MI (US)

( * ) Notice: Subject to any disclaimer, the term of this patent is extended or adjusted under 35 U.S.C. 154(b) by 0 days.

(21) Appl. No.: 16/220,530

(22) Filed: Dec. 14, 2018

(65) Prior Publication Data
US 2019/0190198 A1 Jun. 20, 2019

(30) Foreign Application Priority Data

Dec. 15, 2017 (CN) .......................... 2017 1 1360289

(51) Int. Cl.
H01R 13/627 (2006.01)
H01R 11/22 (2006.01)
F16C 1/10 (2006.01)
F16C 1/26 (2006.01)
B60R 16/02 (2006.01)

(52) U.S. Cl.
CPC ..... *H01R 13/6271* (2013.01); *B60R 16/0215* (2013.01); *F16C 1/105* (2013.01); *F16C 1/26* (2013.01); *H01R 11/22* (2013.01)

(58) Field of Classification Search
CPC . H01R 13/6271; H01R 11/22; B60R 16/0215; F16C 1/26
USPC ........................................................ 439/352
See application file for complete search history.

(56) References Cited

U.S. PATENT DOCUMENTS

| 4,610,383 | A  | * | 9/1986 | Rothfuss    | A61B 17/07207 227/176.1 |
| 6,454,576 | B1 | * | 9/2002 | Hedrick     | H01R 13/5812 439/105    |
| 7,341,480 | B2 | * | 3/2008 | Byrne       | H01R 13/73 439/138      |
| 7,758,369 | B2 | * | 7/2010 | Miller      | H01R 13/6275 439/352    |
| 8,002,583 | B2 | * | 8/2011 | van Woensel | H01R 13/506 439/607.27  |
| 8,257,106 | B2 | * | 9/2012 | Fornage     | H01R 13/639 439/304     |

(Continued)

FOREIGN PATENT DOCUMENTS

CN 203967665 U 11/2014
CN 106655030 A 5/2017

OTHER PUBLICATIONS

CN Office Action for Application No. 201711360289.8.

(Continued)

*Primary Examiner* — Adbullah A Riyami
*Assistant Examiner* — Vladimir Imas
(74) *Attorney, Agent, or Firm* — Cantor Colburn LLP (57) ABSTRACT A cable conduit end for securing a cable to a cable abutment of a latch is provided. The cable conduit end including: a housing; an alignment feature incorporated into a surface of the housing; a pair of flexible retention features integrally formed with the housing of the conduit end, wherein the flexible retention features are spring biased into a first position.

11 Claims, 6 Drawing Sheets (56) References Cited

U.S. PATENT DOCUMENTS 8,947,319 B2 * 2/2015 Simmons ............... H01Q 1/007
                                                    174/68.1
10,465,742 B2 * 11/2019 Estrada .................. F16C 1/262

OTHER PUBLICATIONS

CN Search Report for Application No. 201711360289.8.
English Machine Translation to CN203967665.
English Translation to CN Office Action for Application No. 201711360289.8.

* cited by examiner

CABLE END FITTING AND CABLE ABUTMENT AND METHOD OF SECUREMENT

CROSS REFERENCE TO RELATED APPLICATIONS

This application claims priority under 35 U.S.C. § 119 to the following Chinese Patent Application No. 201711360289.8, filed on Dec. 15, 2017, the entire contents of which are incorporated herein by reference thereto.

BACKGROUND

Exemplary embodiments of the present disclosure relate generally to latch mechanisms and, more particularly, to end fittings for cables in latch mechanisms.

Conventional latch mechanisms may include multiple cables, each coupled to a lever for carrying out various functions, such as locking and releasing the latch for example. Often, these cables have to be connected to the interior of the latch, accessible by only a small opening through which the cable is inserted. In addition, other components of the latch, such as the door trim fixing plug, may interfere with the positioning of the cable as it is inserted into the latch. This can make the assembly process difficult, time consuming, costly and prone to error. It is also difficult to disassemble the cable connection for maintenance without damaging the cable, the cable fitting or the latch.

When using a cable assembly to release a door latch, either from inside or outside handle, it is desirable that the sleeve, or conduit, that the cable is guided by be anchored robustly at each end so as to avoid inadvertent disengagement that would render the cable inoperable. It is also desirable that this anchor mechanism, between the cable conduit end and the housing or bracket that it is retained by, be capable of being installed through a minimal amount of force, for ergonomic reasoning, and be able to withstand a high disengagement force per the aforementioned reasoning.

Accordingly, it is desirable to provide a cable abutment and complimentary cable end that provides a quick and efficient means for securing a cable conduit to a portion of a latch being operated by the cable.

SUMMARY OF THE DISCLOSURE

In one embodiment, a cable conduit end for securing a cable to a cable abutment of a latch is provided. The cable conduit end including: a housing; an alignment feature incorporated into a surface of the housing; a pair of flexible retention features integrally formed with the housing of the conduit end, wherein the flexible retention features are spring biased into a first position.

In addition to one or more of the features described above, or as an alternative to any of the foregoing embodiments, the cable conduit end includes a cable extending through an opening in the cable conduit end.

In addition to one or more of the features described above, or as an alternative to any of the foregoing embodiments, the cable conduit end includes a cable sheath extending over a portion of the cable and secured to an end of the housing.

In addition to one or more of the features described above, or as an alternative to any of the foregoing embodiments, the alignment feature may be located between the pair of flexible retention features.

In addition to one or more of the features described above, or as an alternative to any of the foregoing embodiments, each of the pair of flexible retention features may include two flexible retention features.

In addition to one or more of the features described above, or as an alternative to any of the foregoing embodiments, the flexible retention features may include an angled surface located at a distal end of the flexible retention features.

In yet another embodiment, a cable conduit end and a cable abutment of a latch housing are provided, the cable conduit end being configured to secure a cable to the cable abutment, the cable conduit end having: a housing; an alignment feature incorporated into a surface of the housing; a pair of flexible retention features integrally formed with the housing of the conduit end, wherein the flexible retention features are spring biased into a first position; and wherein the cable abutment has an opening configured to slidably received the cable conduit end therein.

In addition to one or more of the features described above, or as an alternative to any of the foregoing embodiments, the cable conduit end is configured to snap-fittingly engage the opening of the cable abutment.

In addition to one or more of the features described above, or as an alternative to any of the foregoing embodiments, the alignment feature engages side walls of the opening of the cable abutment when the cable conduit end is inserted into the cable abutment.

In addition to one or more of the features described above, or as an alternative to any of the foregoing embodiments, the cable conduit end includes a cable extending through an opening in the cable conduit end.

In addition to one or more of the features described above, or as an alternative to any of the foregoing embodiments, a cable sheath extends over a portion of the cable and is secured to an end of the housing.

In addition to one or more of the features described above, or as an alternative to any of the foregoing embodiments, the alignment feature may be located between the pair of flexible retention features.

In addition to one or more of the features described above, or as an alternative to any of the foregoing embodiments, each of the pair of flexible retention features has two flexible retention features.

In addition to one or more of the features described above, or as an alternative to any of the foregoing embodiments, the flexible retention features may include an angled surface located at a distal end of the flexible retention features.

In yet another embodiment, a method of securing a cable conduit end to a cable abutment of a latch housing is provided, The method including the steps of: inserting a housing of the cable conduit end into an opening of the cable abutment; guiding an alignment feature incorporated into a surface of the housing between a pair of features located in the opening of the cable abutment; deflecting a pair of flexible retention features integrally formed with the conduit end outwardly from a first position as the cable conduit end as it is inserted into the opening of the cable abutment; engaging a pair of retention features of the cable abutment with a distal end of the pair of flexible retention features after they have been deflected back towards the first position, wherein the pair of flexible retention features are spring biased into the first position; and engaging a pair of side walls of the opening of the cable abutment with the alignment feature.

The above-described and other features and advantages of the present disclosure will be appreciated and understood by those skilled in the art from the following detailed description, drawings, and appended claims.

BRIEF DESCRIPTION OF THE DRAWINGS

Embodiments of the present disclosure will now be described, by way of example only, with reference to the accompanying drawings in which.

DETAILED DESCRIPTION

Various embodiments of the present disclosure are directed to a cable abutment configured for a snap-in design wherein once secured, the cable abutment withstands axial and/or radial forces removal forces. The cable abutment is configured to have a low insertion force as compared to the higher removal forces it is capable of withstanding.

Figure 1:
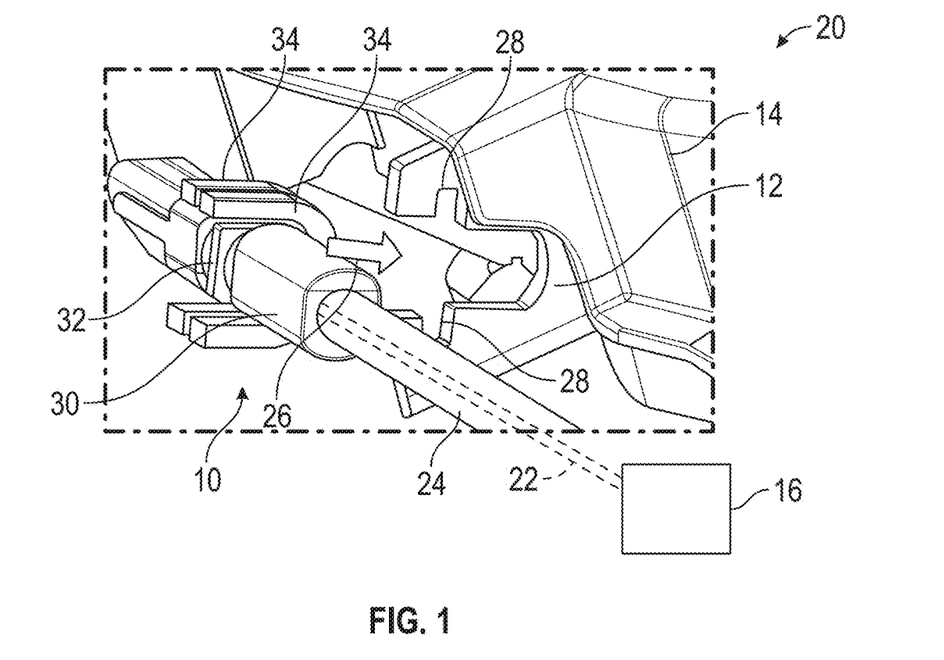
FIGS. 1-3 are perspective views of a portion of a latch housing including a cable abutment and a cable end configured for securement of a cable and/or cable sheath to the latch housing.

Referring now to the attached FIGS. a cable conduit end, conduit end, cable end fitting or cable attachment end 10 is illustrated. The cable conduit end 10 is configured to be snap-fittingly inserted into a cable abutment 12, which in one embodiment may be a portion of a latch housing 14 or alternatively the cable abutment 12 is separately secured to the latch housing 14. In one embodiment, the latch housing 14 may be a portion of a vehicle latch that is operated by an inside release handle or outside release handle 16 that is operatively coupled to a portion 18 (illustrated schematically) of the latch 20 via a cable 22 that is slidably received within a cable sheath 24 and the cable conduit end 10. The cable 22 and cable sheath 24 are formed from flexible materials and the cable 22 is capable of transmitting a pulling or pushing force. In one non-limiting embodiment and as is known in the related arts, the cable 22 and cable sheath 24 may be collectively referred to as a Bowden cable. In FIG. 1, the cable conduit end 10 is shown as not being attached to housing 14 yet. In one embodiment, the cable conduit end may be formed out of an easily molded material such as plastic.

In order to secure the cable conduit end 10 to the housing 14, the cable conduit end 10 is inserted into the cable abutment 12 of the housing 14 in the direction of arrow 26. The cable conduit end 10 is configured to be secured thereto via a low insertion effort while having a high retention valve. In order to do this, the cable conduit end 10 and the latch cable abutment 12 are configured to accept a linear load geometry.

With the proposed geometry, the retention value of the conduit end 10 can be drastically increased without sacrificing the desirability of a low insertion effort. In order to do so, retaining features or openings or slots 28 are added to the cable abutment 12 in order to keep a barrel or housing 30 of the conduit end 10 securely fastened to the latch housing 14.

In addition, an alignment feature or tab 32 is incorporated into a surface of the housing 30 of the conduit end 10 in order to properly direct the conduit end 10 into the correct orientation when it is being inserted into housing 12 in the direction of arrow 26. With the conduit end 10 in the proper orientation, two pairs of flexible retention features 34 integrated into the conduit end 10, will align with and engage the retaining features 28 of the latch housing cable abutment 12. In one embodiment, the flexible retention features 34 are located on opposite sides of the alignment feature or tab 32.

In one embodiment, the flexible retention features 34 are formed from a resilient material such as plastic or equivalents thereof and are spring biased in the direction of arrows 38 into the positions illustrated in the FIGS. For example, the flexible retention features 34 and alignment feature or tab 32 may be integrally formed with conduit end 10. As the conduit end 10 is inserted into an opening 40 of the latch housing cable abutment 14, these flexible, snap-in features 34 will deflect outwardly against the biasing force of arrows 38. Accordingly and during assembly of conduit end 10 to opening 40 of the cable abutment 12, the deflection of these features outwardly allow for a low insertion effort. Once the conduit end 10 is fully inserted these features will spring back in the direction of arrows 38 to the position or first position illustrated in the FIGS. At this point and as illustrated in at least FIGS. 2, 3 and 6A-6C, a distal end 42 of the retaining features 34 engage a respective one of retaining features or openings 28. In one embodiment, the distal end 42 may have an angled or chamfered surface 43 that causes a gap between the flexible retention features 34 to become smaller.

Once engaged, a pull-out force on the conduit end in a direction opposite to arrow 26 will be managed by the geometry of the flexible features 34. Furthermore, the geometry of the retention features 34 and the latch housing cable abutment interface is such that if abusive loading occurs, the engagement at this interface will be locked in, further assuring engagement. Still further, the flexible retention features 34 will also engage opposite ends of the cable abutment 12 to prevent sliding or movement of the conduit end 10 in the direction of arrows 45.

Figure 2:
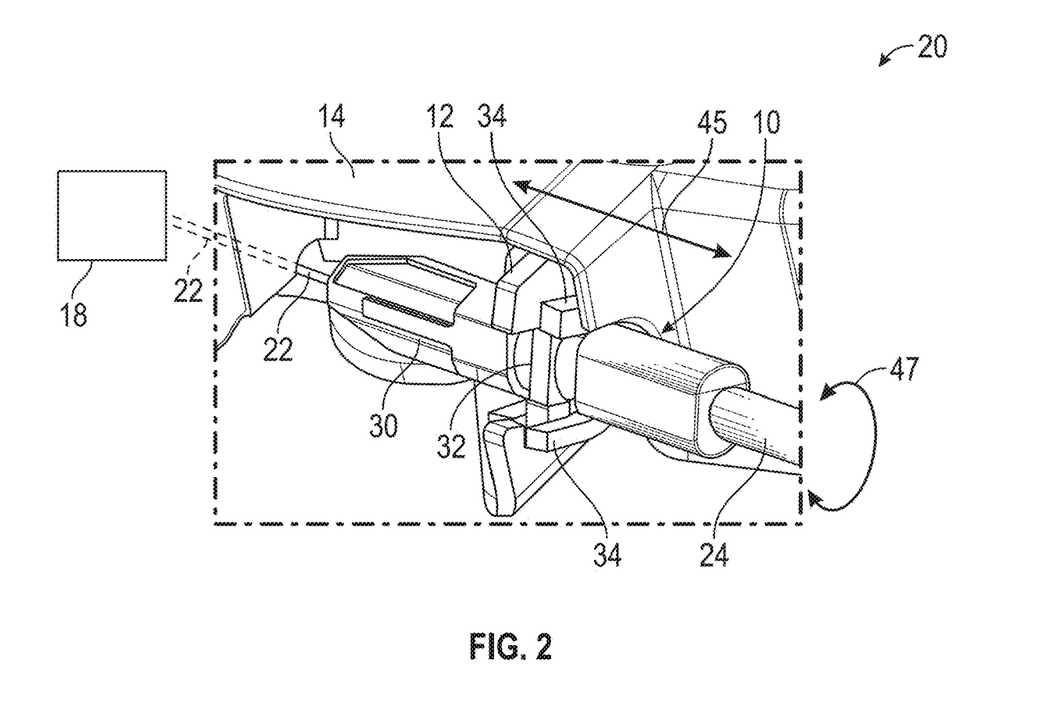
Figure 3:
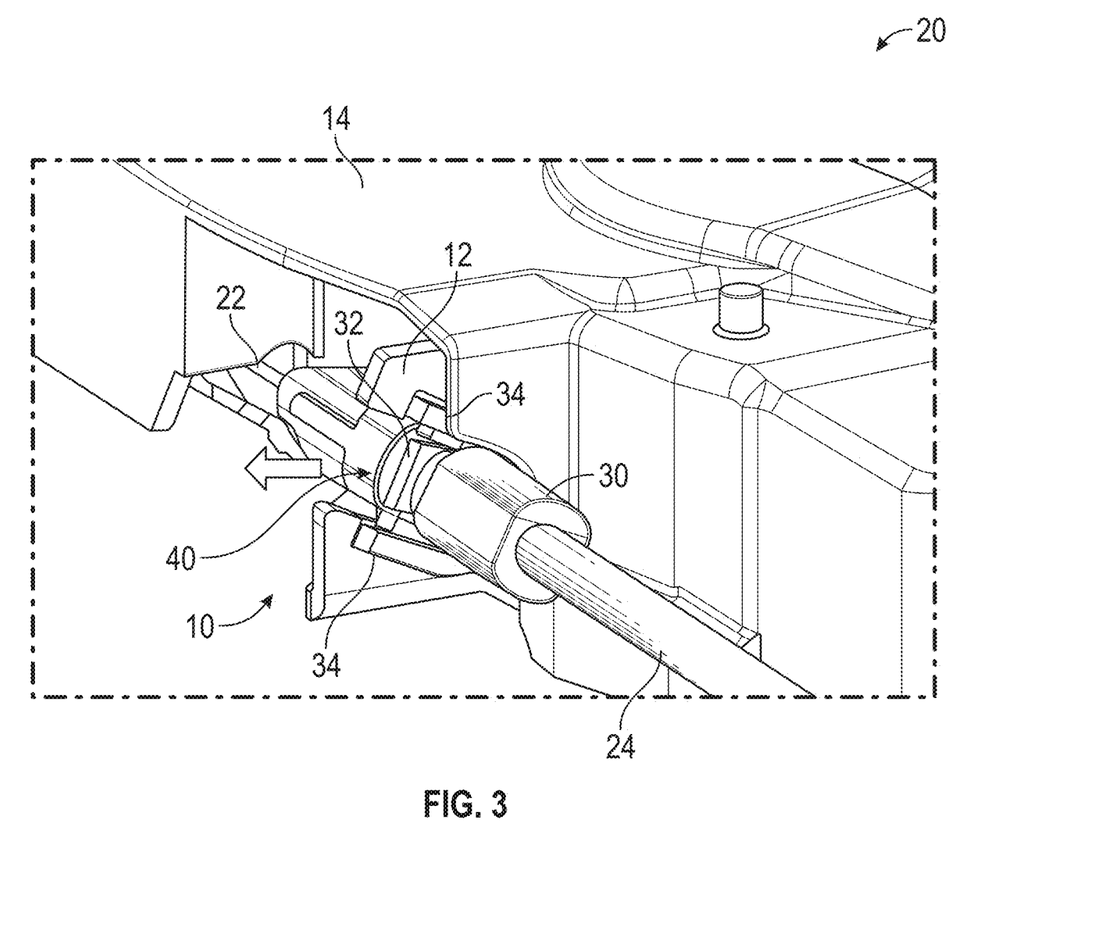
Figure 4A:
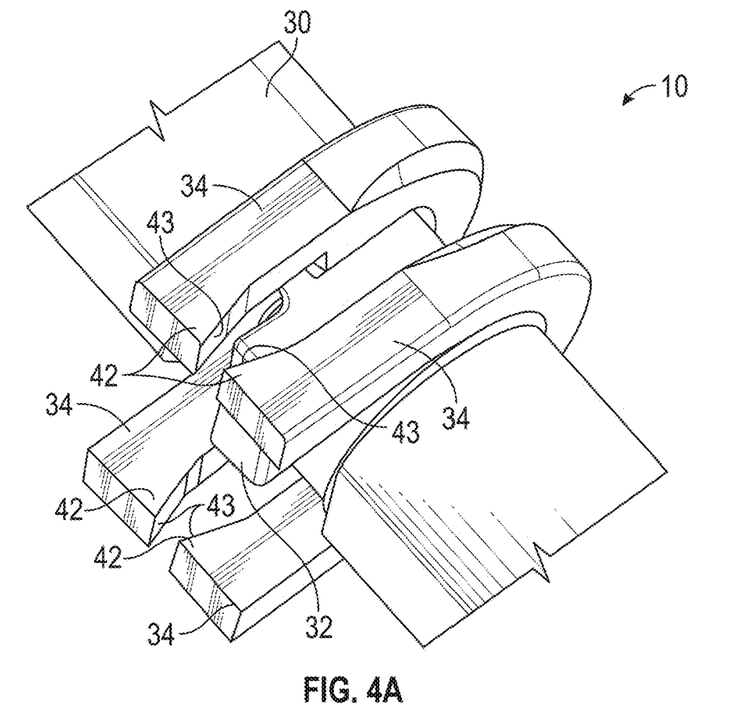
FIGS. 4A-4D are perspective views of a portion of a cable end fitting according to an embodiment of the present disclosure.
Figure 4B:
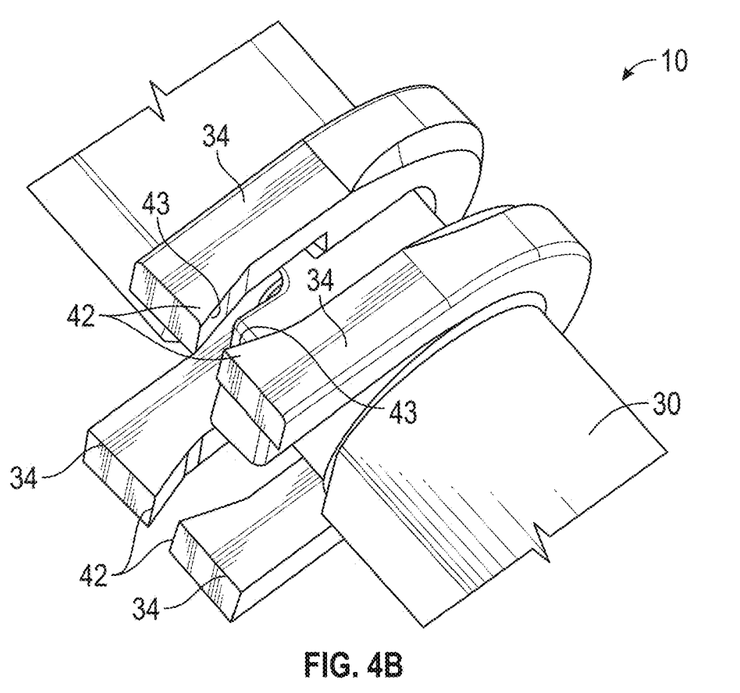
Figure 4C:
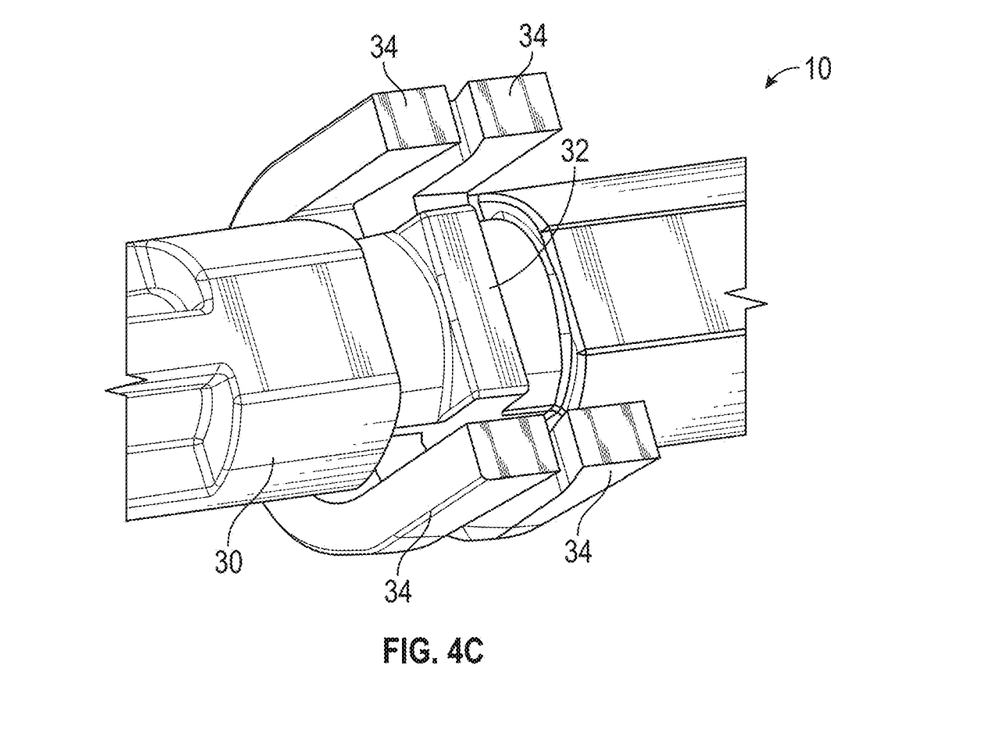
Figure 4D:
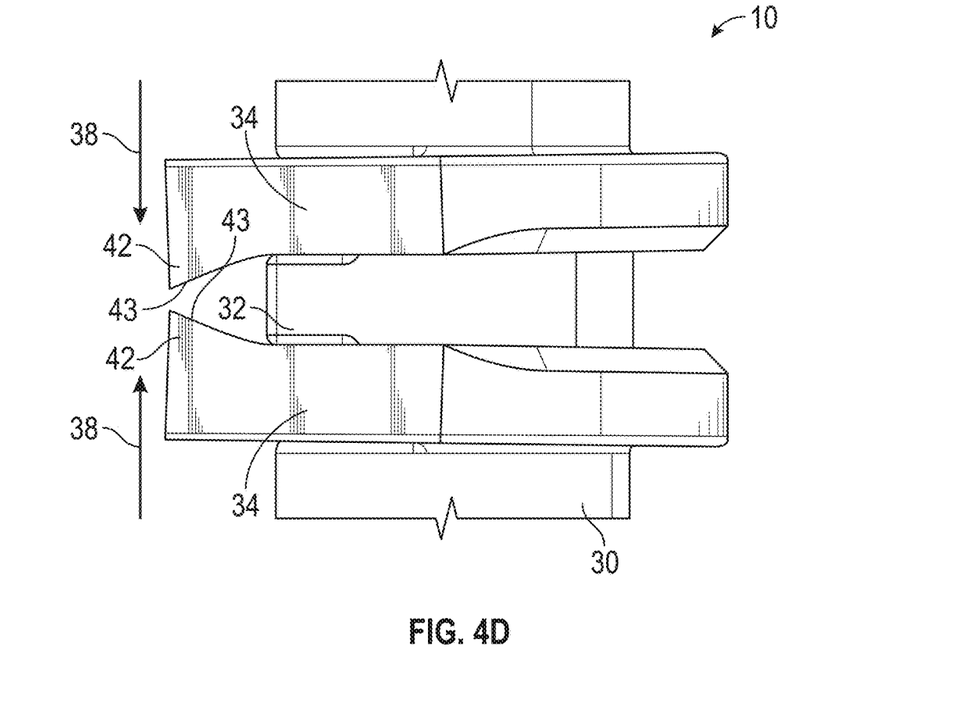
Figure 5:
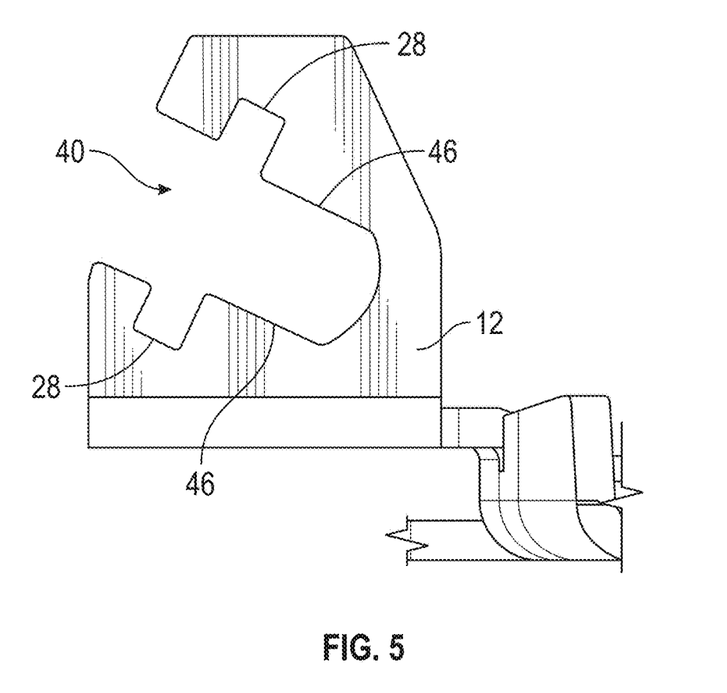
FIG. 5 is a side view of a cable abutment according to an embodiment of the present disclosure.

The alignment feature or tab 32 has surfaces that are configured to engage side walls 46 of the opening 40. The engagement of these side walls 46 with the surfaces of alignment feature or tab 32 provides a radial or rotational retention feature that is prevents rotation of the conduit end 10 when it is inserted into opening 40 of the cable abutment 10. The engagement of these side walls 46 with the features of tab 32 will prevent the conduit end 10 from rotating in the cable abutment 12 by resisting rotational forces about an axis of the cable conduit end 10. As such, rotation in the direction of arrows 47 is prevented. In FIG. 2, the area of engagement of the conduit end 10 with the cable abutment 12 is located on opposite ends of the tab or alignment feature 32.

Figure 6A:
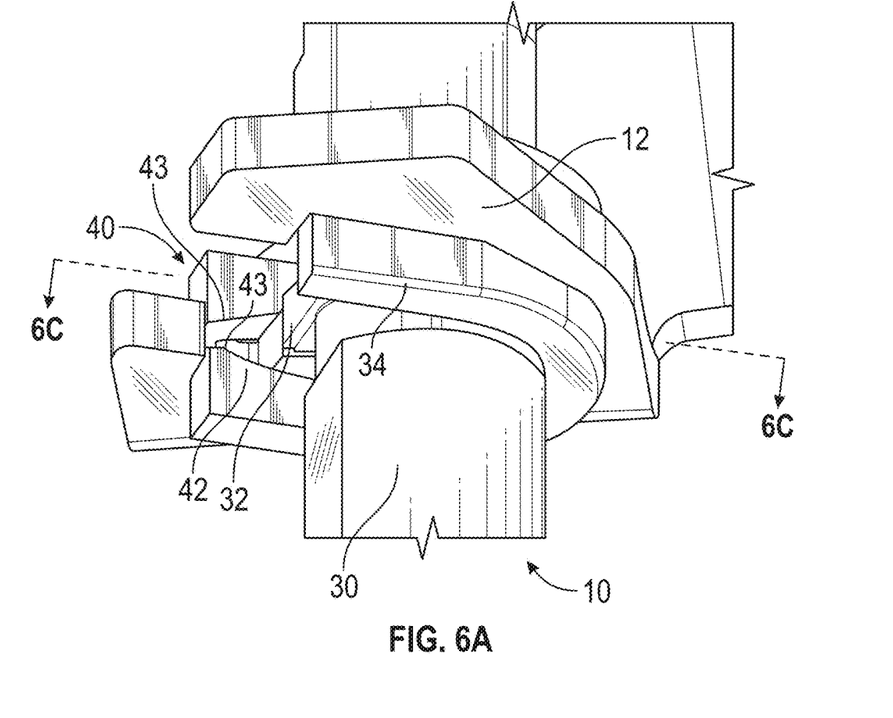
FIGS. 6A-6B are perspective views illustrating the cable end secured to the cable abutment.
Figure 6B:
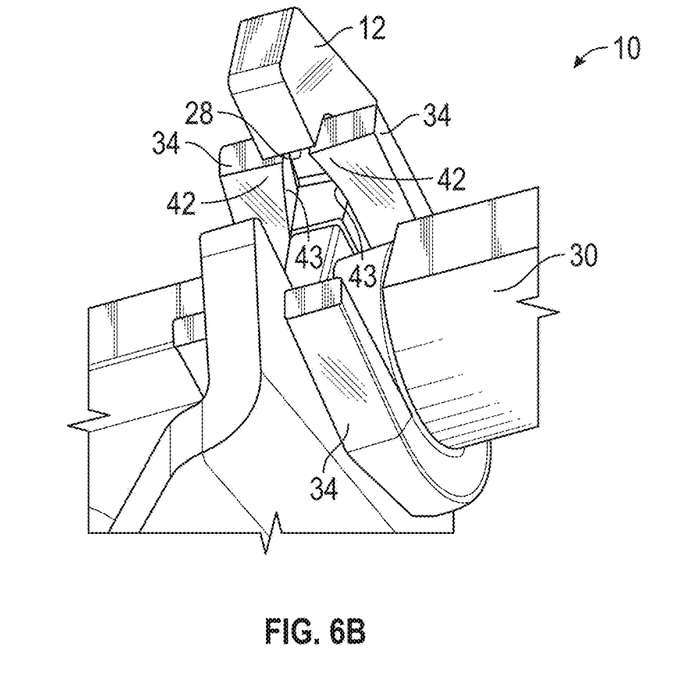
Figure 6C:
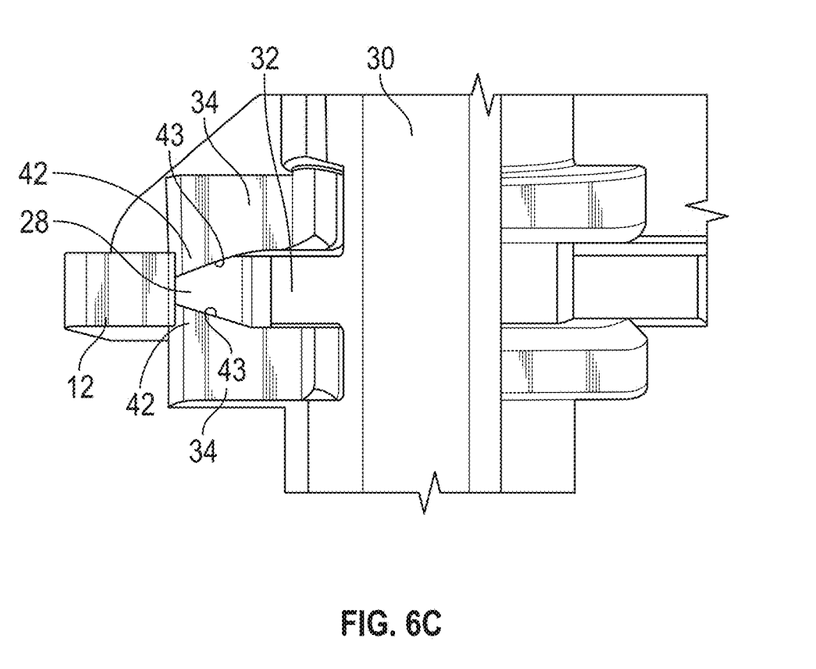
FIG. 6C is a view along lines 6C-6C of FIG. 6A.

FIGS. 6A-6C are various views illustrating the securement of the cable end 10 into opening 40 of the cable abutment 12.

Conduit end 10 also has a passage extending therethrough to allow cable 22 to pass through. Sheath 24 is also secured to the conduit end 10 by any suitable process such as crimping, insert molding, etc.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A cable conduit end for securing a cable to a cable abutment of a latch, the cable conduit end comprising:
    a housing;
    an alignment feature incorporated into an exterior surface of the housing;
    a first pair of flexible retention features integrally formed with the housing of the conduit end and extending away from the exterior surface of the housing, the first pair of flexible retention features being in a facing spaced relationship with respect to each other and are spring biased into a first position;
    a second pair of flexible retention features integrally formed with the housing of the conduit end and extending away from the exterior surface of the housing, the second pair of flexible retention features being in a facing spaced relationship with respect to each other and are spring biased into a first position, wherein the first pair of flexible retention features are in a facing spaced relationship with respect to the second pair of flexible retention features and the alignment feature is located between the first pair of flexible retention features and the second pair of flexible retention features.

2. The cable conduit end as in claim 1, wherein the cable extends through an opening in the cable conduit end.

3. The cable conduit end as in claim 2, further comprising a cable sheath extending over a portion of the cable and secured to an end of the housing.

4. The cable conduit end as in claim 1, wherein the first pair of flexible retention features and the second pair of flexible retention features further comprise an angled surface located at a distal end of the first pair of flexible retention features and the second pair of flexible retention features.

5. In combination, a cable conduit end and a cable abutment of a latch housing, the cable conduit end being configured to secure a cable to the cable abutment, the cable conduit end comprising:
    a housing;
    an alignment feature incorporated into an exterior surface of the housing;
    a first pair of flexible retention features integrally formed with the housing of the conduit end and extending away from the exterior surface of the housing, the first pair of flexible retention features being in a facing spaced relationship with respect to each other and are spring biased into a first position;
    a second pair of flexible retention features integrally formed with the housing of the conduit end and extending away from the exterior surface of the housing, the second pair of flexible retention features being in a facing spaced relationship with respect to each other and are spring biased into a first position, wherein the first pair of flexible retention features are in a facing spaced relationship with respect to the second pair of flexible retention features and the alignment feature is located between the first pair of flexible retention features and the second pair of flexible retention features; and
    wherein the cable abutment has an opening configured to slidably received the cable conduit end therein.

6. The combination as in claim 5, wherein the first pair of flexible retention features and the second pair of flexible retention features snap-fittingly secure the cable conduit end to the cable abutment when the housing is inserted into the opening of the cable abutment.

7. The combination as in claim 5, wherein the alignment feature engages side walls of the opening of the cable abutment when the housing of the cable conduit end is inserted into the opening of the cable abutment.

8. The combination as in claim 5, wherein the cable extends through an opening in the cable conduit end.

9. The combination as in claim 8, further comprising a cable sheath extending over a portion of the cable and secured to an end of the housing.

10. The combination as in claim 5, wherein the first pair of flexible retention features and the second pair of flexible retention features further comprise an angled surface located at a distal end of the first pair of flexible retention features and the second pair of flexible retention features.

11. A method of securing a cable conduit end to a cable abutment of a latch housing, comprising:
    inserting a housing of the cable conduit end into an opening of the cable abutment;
    guiding an alignment feature incorporated into an exterior surface of the housing between a pair of features located in the opening of the cable abutment;
    deflecting a first pair of flexible retention features integrally formed with the conduit end and extending away from the exterior surface of the housing outwardly from a first position as the cable conduit end as it is inserted into the opening of the cable abutment, the first pair of flexible retention features being in a facing spaced relationship with respect to each other;
    deflecting a second pair of flexible retention features integrally formed with the conduit end and extending away from the exterior surface of the housing outwardly from a first position as the cable conduit end as it is inserted into the opening of the cable abutment, the second pair of flexible retention features being in a facing spaced relationship with respect to each other, and wherein the first pair of flexible retention features are in a facing spaced relationship with respect to the second pair of flexible retention features and the alignment feature is located between the first pair of flexible retention features and the second pair of flexible retention features;
    engaging a first pair of retention features of the cable abutment with a distal end of the first pair of flexible retention features after they have been deflected back towards the first position, wherein the first pair of flexible retention features are spring biased into the first position;
    engaging a second pair of retention features of the cable abutment with a distal end of the second pair of flexible retention features after they have been deflected back towards the first position, wherein the second pair of flexible retention features are spring biased into the first position; and
    engaging a pair of side walls of the opening of the cable abutment with the alignment feature.

* * * * *